US009834382B2

(12) United States Patent
Van Den Berg et al.

(10) Patent No.: US 9,834,382 B2
(45) Date of Patent: Dec. 5, 2017

(54) MODULAR CONVEYOR BELT, MODULAR BELT LINK AND MOLDING METHOD FOR MANUFACTURING SUCH A MODULAR BELT LINK

(71) Applicant: REXNORD FLATTOP EUROPE B.V., 's-Gravenzande (NL)

(72) Inventors: Rick Wilhelmus Van Den Berg, 's-Gravenzande (NL); Cornelis Hendrik Mijndert Menke, 's-Gravenzande (NL)

(73) Assignee: REXNORD FLATTOP EUROPE B.V., 's-Gravenzande (NL)

( * ) Notice: Subject to any disclaimer, the term of this patent is extended or adjusted under 35 U.S.C. 154(b) by 0 days.

(21) Appl. No.: 15/319,291

(22) PCT Filed: Jun. 17, 2015

(86) PCT No.: PCT/NL2015/050443
§ 371 (c)(1),
(2) Date: Dec. 15, 2016

(87) PCT Pub. No.: WO2015/194951
PCT Pub. Date: Dec. 23, 2015

(65) Prior Publication Data
US 2017/0137225 A1  May 18, 2017

(30) Foreign Application Priority Data

Jun. 18, 2014  (NL) .................................... 2013023

(51) Int. Cl.
*B65G 17/38* (2006.01)
*B65G 17/40* (2006.01)
(Continued)

(52) U.S. Cl.
CPC .......... *B65G 17/40* (2013.01); *B29C 45/0003* (2013.01); *B65G 17/08* (2013.01); *B29L 2031/7092* (2013.01)

(58) Field of Classification Search
CPC ............................... B65G 17/38; B65G 17/40
(Continued)

(56) References Cited

U.S. PATENT DOCUMENTS 5,125,504 A * 6/1992 Corlett .................. B65G 17/08
198/850
5,303,818 A * 4/1994 Gruettner ............... B65G 17/08
198/850
(Continued)

OTHER PUBLICATIONS

International Search Report and Written Opinion dated Sep. 8, 2015 in connection with PCT/NL2015/050443.

*Primary Examiner* — James R Bidwell
(74) *Attorney, Agent, or Firm* — Quarles & Brady LLP

(57) ABSTRACT

In a method for manufacturing such a modular belt link, a mold having a mold cavity is used comprising a number of U-shaped profiles, which are configured and arranged such as to—after injecting polymeric material into the mold cavity—form an aperture in each of the link ends by providing for each link end at least two laterally adjoining, partly overlapping oblong U-shaped recesses which are alternately oriented such that the open end of one of the U-shaped recesses opens in the top support surface and the open end of an immediately adjoining U-shaped recess opens in the bottom surface. The invention relates also to a modular belt link manufactured with such a method and a modular conveyor belt comprising such modular belt links.

15 Claims, 3 Drawing Sheets

(51) Int. Cl.
*B65G 17/08* (2006.01)
*B29C 45/00* (2006.01)
*B29L 31/00* (2006.01)

(58) Field of Classification Search
USPC .................................. 198/850, 852, 853
See application file for complete search history.

(56) References Cited

U.S. PATENT DOCUMENTS

| | | | | |
|---|---|---|---|---|
| 5,332,084 | A * | 7/1994 | Greve | .................... B65G 17/08 198/851 |
| 6,997,308 | B2 * | 2/2006 | Guemsey | ............... B65G 17/08 198/850 |
| 7,364,036 | B2 * | 4/2008 | Schoepf | ................. B65G 17/08 198/850 |
| 2002/0179417 | A1 | 12/2002 | Cediel et al. | |

* cited by examiner

MODULAR CONVEYOR BELT, MODULAR BELT LINK AND MOLDING METHOD FOR MANUFACTURING SUCH A MODULAR BELT LINK

CROSS-REFERENCE TO RELATED APPLICATIONS

This application represents the national stage entry of PCT International Application No. PCT/NL2015/050443 filed Jun. 17, 2015, which claims the benefit of Netherlands Patent Application No. 2013023 filed Jun. 18, 2014, the disclosures of which are hereby incorporated by reference in their entirety for all purposes.

The invention relates to a modular conveyor belt comprising a plurality of modular belt links, each modular belt link having a leading edge and a trailing edge, each modular belt link further comprising a first plurality of laterally spaced link ends on the leading edge and a second plurality of laterally spaced link ends on the trailing edge, wherein the link ends of the first plurality are offset with regard to the link ends of the second plurality for inserting link ends on a trailing edge of one modular belt link between link ends on the leading edge of an adjacent modular belt link, each link end circumscribing an aperture, wherein the apertures of the link ends of the first plurality are aligned along a first axis and wherein the apertures of the link ends of the second plurality are aligned along a second axis, said modular belt link further comprising a top support surface provided between said leading and trailing edge, a bottom surface opposite the top surface and hinge connectors, such as pivot pins or pivot rods, received in the respective apertures for pivotally connecting the plurality of modular belt links thus forming the modular conveyor belt.

Such a modular belt conveyor is for example known from US-A1-2002/0179417. Each of the link ends of the first plurality of the modular belt link of said modular belt conveyor includes generally cylindrically-shaped pivot rod aperture, which during a molding method for manufacturing such belt links are realized by the provision of a cylindrical rod in a mold. Similarly, each of the link ends of the second plurality of the modular belt link of said modular belt conveyor includes generally oblong apertures or slots. During a molding method for manufacturing such belt links the oblong slots are provided by the provision of a similarly shaped oblong rod in the mold. In the known modular belt link the cylindrically-shaped apertures are aligned along a first axis and the oblong slots of are aligned along a second axis which is parallel to the first axis.

It is an object of the invention to provide a modular conveyor belt comprising a plurality of alternative modular belt links. It is an other object of the invention to provide a modular conveyor belt comprising modular belt links which can be manufactured at a reduced cost. It is a further object of the invention to provide a molding method for manufacturing such a modular belt link, in which molding method the cycle time for producing a modular belt link is reduced, thereby saving time and costs.

According to one aspect of the invention there is provided a modular conveyor belt comprising a plurality of modular belt links, each modular belt link having a leading edge and a trailing edge, each modular belt link further comprising a first plurality of laterally spaced link ends on the leading edge and a second plurality of laterally spaced link ends on the trailing edge, wherein the link ends of the first plurality are offset with regard to the link ends of the second plurality for inserting link ends on a trailing edge of one modular belt link between link ends on the leading edge of an adjacent modular belt link, each link end circumscribing an aperture, wherein the apertures of the link ends of the first plurality are aligned along a first axis and wherein the apertures of the link ends of the second plurality are aligned along a second axis, said modular belt link further comprising a top support surface provided between said leading and trailing edge, a bottom surface opposite the top surface and hinge connectors, such as pivot pins or pivot rods, received in the respective apertures for pivotally connecting the plurality of modular belt links thus forming the modular conveyor belt, characterized in that the aperture in each of the link ends is formed by at least two laterally adjoining, partly overlapping oblong U-shaped recesses, which are alternately oriented such that the open end of one of the U-shaped recesses opens in the top support surface and the open end of an immediately adjoining U-shaped recess opens in the bottom surface. By forming the apertures in each of the link ends by such partly overlapping oblong U-shaped recesses, not only an alternative modular belt link is provided, but also the molding method for manufacturing such a modular belt link can be performed faster and thus cheaper.

In an embodiment of a modular conveyor belt according to the invention the oblong U-shaped recesses of one link end, preferably a link end of the first plurality of laterally spaced link ends, overlap each other such that the aperture formed is circular. In a further embodiment of a modular conveyor belt according to the invention, the oblong U-shaped recesses of one link end, preferably a link end of the second plurality of laterally spaced link ends, overlap each other such that the aperture formed is slot shaped.

In a still further embodiment of a modular conveyor belt according to the invention the shape and/or dimension of an aperture of one link end of a plurality is identical to the shape and/or dimension of the aperture of the other link ends of said plurality. However, according to the invention it is possible to provide an alternative embodiment of a modular conveyor belt in which the shape and/or dimension of an aperture of one link end of a plurality differs from the shape and/or dimension of the aperture of at least one of the other link ends of said plurality.

According to the invention a modular conveyor belt can be provided in which the first axis and the second axis are parallel. In an alternative embodiment of a modular conveyor belt according to the invention the first axis and the second axis are positioned under a sharp angle with respect to each other, said angle having a value between 0.5° and 20°, preferably about 7°. This latter means that the modular belt link is substantially triangular in shape.

According to a further aspect of the invention a modular belt link configured for use in a conveyor belt is provided, said modular belt link having a leading edge and a trailing edge and further comprising a first plurality of laterally spaced link ends on the leading edge and a second plurality of laterally spaced link ends on the trailing edge, wherein the link ends of the first plurality are offset with regard to the link ends of the second plurality, each link end circumscribing an aperture, wherein the apertures of the link ends of the first plurality are aligned along a first axis and wherein the apertures of the link ends of the second plurality are aligned along a second axis, said modular belt link further comprising a top support surface provided between said leading and trailing edge and a bottom surface opposite the top surface, characterized in that the aperture in each of the link ends is formed by at least two laterally adjoining, partly overlapping oblong U-shaped recesses, which are alternately oriented such that the open end of one of the U-shaped recesses opens in the top support surface and the open end of an immediately adjoining U-shaped recess opens in the bottom surface.

Preferably the oblong U-shaped recesses of one link end preferably a link end of the first plurality of laterally spaced link ends, overlap each other such that the aperture formed is circular. In a further embodiment the oblong U-shaped recesses of one link end, preferably a link end of the second plurality of laterally spaced link ends, overlap each other such that the aperture formed is slot shaped.

In an embodiment of a modular belt link according to the invention the shape and/or dimension of an aperture of one link end of a plurality is identical to the shape and/or dimension of the aperture of the other link ends of said plurality. In an alternative embodiment of a modular belt link according to the invention the shape and/or dimension of an aperture of one link end of a plurality differs from the shape and/or dimension of the aperture of at least one of the other link ends of said plurality.

According to the invention a modular belt link can be provided in which the first axis and the second axis are parallel. In an alternative embodiment of a modular belt link according to the invention the first axis and the second axis are positioned under a sharp angle with respect to each other, said angle having a value between 0.5° and 20°, preferably about 7°. This latter means that the modular belt link is substantially triangular in shape.

In a still further aspect the invention relates to a molding method for manufacturing a modular belt link according to the invention, in which the method comprising the step of providing a mold having mating mold halves providing a mold cavity for a modular belt link and the step of injecting polymeric material into the mold cavity, said mold cavity being configured such that after molding a modular belt link is obtained having a leading edge and a trailing edge and further comprising a first plurality of laterally spaced link ends on the leading edge and a second plurality of laterally spaced link ends on the trailing edge, wherein the link ends of the first plurality are offset with regard to the link ends of the second plurality, each link end circumscribing an aperture, wherein the apertures of the link ends of the first plurality are aligned along a first axis and wherein the apertures of the link ends of the second plurality are aligned along a second axis, said molded modular belt link further comprising a top support surface provided between said leading and trailing edge and a bottom surface opposite the top surface, characterized in that the mold comprises a number of U-shaped profiles, which are configured and arranged such as to—after injecting polymeric material into the mold cavity—form the aperture in each of the link ends by providing for each link end at least two laterally adjoining, partly overlapping oblong U-shaped recesses, which are alternately oriented such that the open end of one of the U-shaped recesses opens in the top support surface and the open end of an immediately adjoining U-shaped recess opens in the bottom surface. When compared to the molding method described in US-A1-2002/0179417 in which rods have to be used during molding to form the cylindrical and oblong apertures, such rods are not necessary in the inventive molding method, which not only reduces the cycle time for molding a modular belt link but which also puts less demands on the mold used during molding, which thus can be cheaper than a conventional mold.

These and other objects and advantages of the invention will become more apparent from the following detailed description of an exemplary embodiment of a conveyor and lubricating system according to the invention taken in conjunction with the accompanying drawings.

The invention will be described with regard to a modular belt conveyor comprising triangular modular belt links, in other words modular belt links in which the first axis along which the apertures of the link ends of the first plurality are aligned and the second axis along which the apertures of the link ends of the second plurality are aligned are positioned under a sharp angle $\alpha$ with respect to each other, said angle having a value between 0.5° and 20°, preferably about 7°. However, the invention also relates to a modular belt conveyor and modular belt links in which the first axis and the second axis are parallel, i.e. rectangular shaped modular belt links. Furthermore, the invention will be described with regard to a modular belt conveyor comprising modular belt links having circular apertures. However, the invention also relates to a modular belt conveyor and to a modular belt link in which slot shaped apertures are provided. In addition, the invention will be described with regard to a modular belt conveyor comprising modular belt links having apertures having an identical shape and dimension. However, the invention also relates to a modular conveyor belt and to a modular belt link in which the shape and/or dimension of an aperture of one link end of a plurality differs from the shape and/or dimension of the aperture of at least one of the other link ends of said plurality. For example, the diameter of the circular apertures at one side of the modular belt link can be smaller than the diameter of the circular apertures at the opposite side of the modular belt link.

Figure 1:
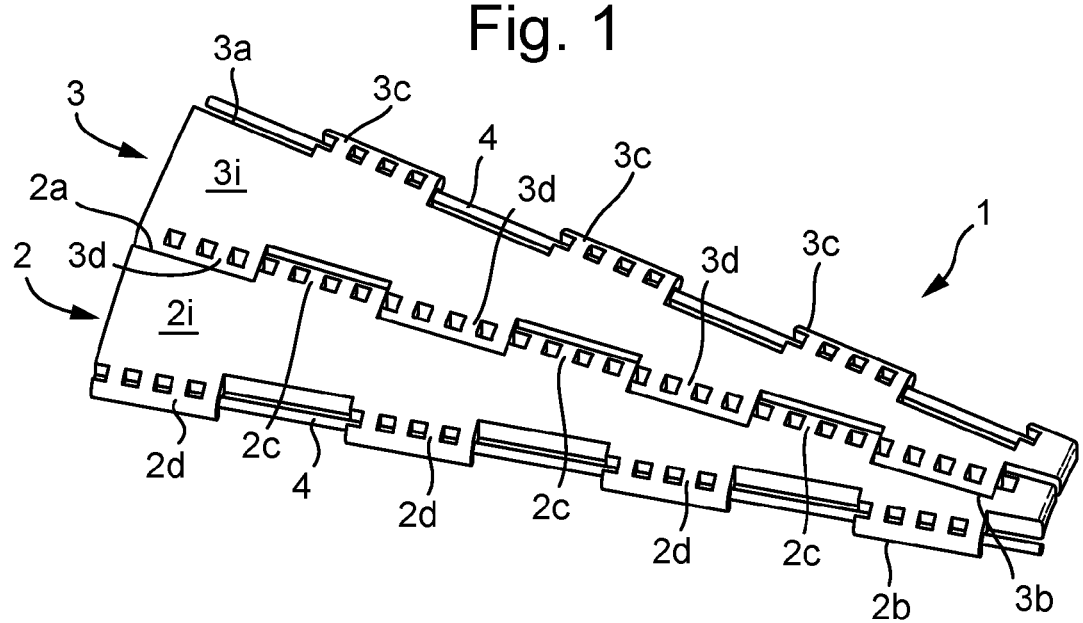
FIG. 1 shows a schematic view of part of a modular belt conveyor according to the invention, in which two triangular modular belt links are shown.

In FIG. 1 a schematic view of part of a modular belt conveyor 1 according to the invention is shown, in which two triangular modular belt links 2 and 3 are shown. Each modular belt link 2, 3 has a leading edge 2a, 3a and a trailing edge 2b, 3b. Each modular belt link 2, 3 further comprises a first plurality of laterally spaced link ends 2c, 3c on the leading edge 2a, 3a and a second plurality of laterally spaced link ends 2d, 3d on the trailing edge 2b, 3b. As clearly shown in FIG. 1, wherein the link ends of the first plurality 2c, 3c are offset with regard to the link ends of the second plurality 2d, 3d for inserting link ends 3d on a trailing edge 3b of the modular belt link 3 between link ends 2c on the leading edge 2a of the adjacent modular belt link 2.

Figure 2:
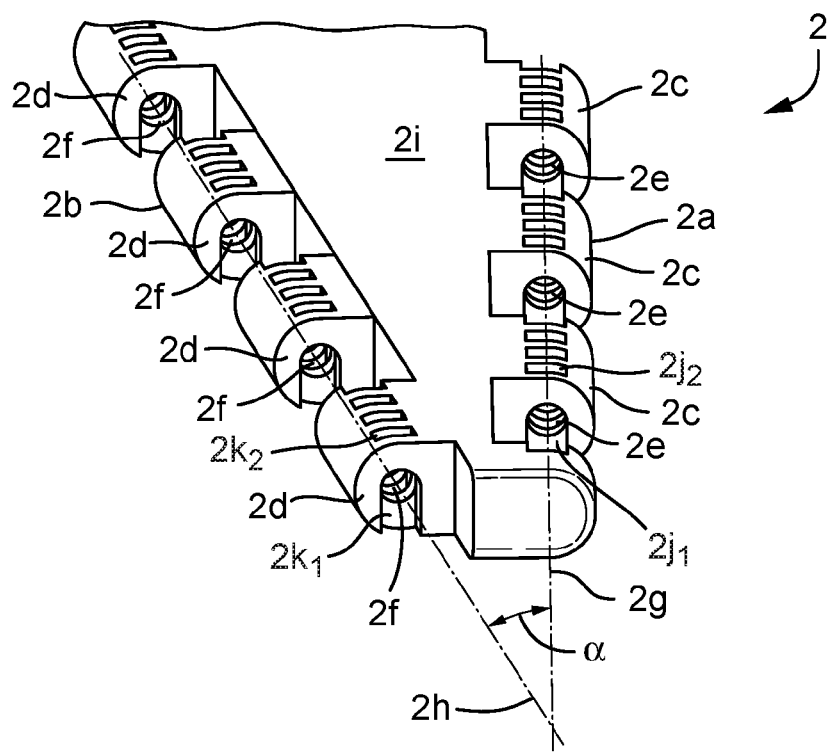
FIG. 2 shows a schematic view in perspective of a triangular modular belt link according to the invention as shown in FIG. 1.

As more clearly shown in FIG. 2 each link end 2c, 2d circumscribes an aperture 2e, 2f, wherein the apertures 2e of the link ends 2c of the first plurality are aligned along a first axis 2g and wherein the apertures 2f of the link ends 2d of the second plurality are aligned along a second axis 2h, which axes 2g, 2h enclose an angle $\alpha$, in this embodiment of about 7°.

Each modular belt link 2, 3 of the modular belt conveyor 1 further comprises a top support surface 2i, 3i provided between said leading 2a, 3a and trailing edge 2b, 3b and a bottom surface (not visible in FIGS. 1, 2, but indicated with 2*l* in FIG. 6) opposite the top surface 2*i*, 3*i*. Hinge connectors 4, such as pivot pins or pivot rods, are received in the respective apertures for pivotally connecting the plurality of modular belt links 2, 3 thus forming the modular conveyor belt 1.

As more clearly visible in FIG. 2 the apertures 2*e*, 2*f* in each of the link ends 2*c*, 2*d* are formed by at least two laterally adjoining, partly overlapping oblong U-shaped recesses 2*j*1, 2*j*2; 2*k*1, 2*k*2, which are alternately oriented such that the open end of one of the U-shaped recesses 2*j*2; 2*k*2 opens in the top support surface 2*i* and the open end of an immediately adjoining U-shaped recess 2*j*1; 2*k*1 opens in the bottom surface. In the embodiment shown in the Figures the oblong U-shaped recesses of one link end overlap each other such that the aperture 2*e*, 2*f* is circular. In addition, in the shown embodiment the dimension, i.e. the diameters of all the apertures 2*e*, 2*f* are identical to each other.

Figure 3:
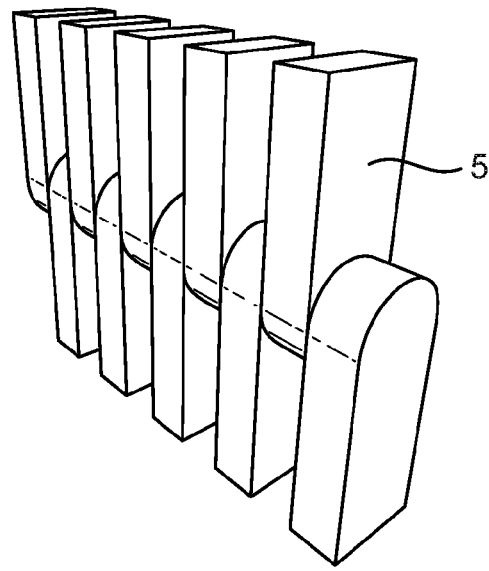
FIG. 3 shows a schematic view in perspective of a number of U-shaped profiles which are part of a mold used in a molding method according to the invention in a situation before polymeric material is injected into the mold cavity.
Figure 4:
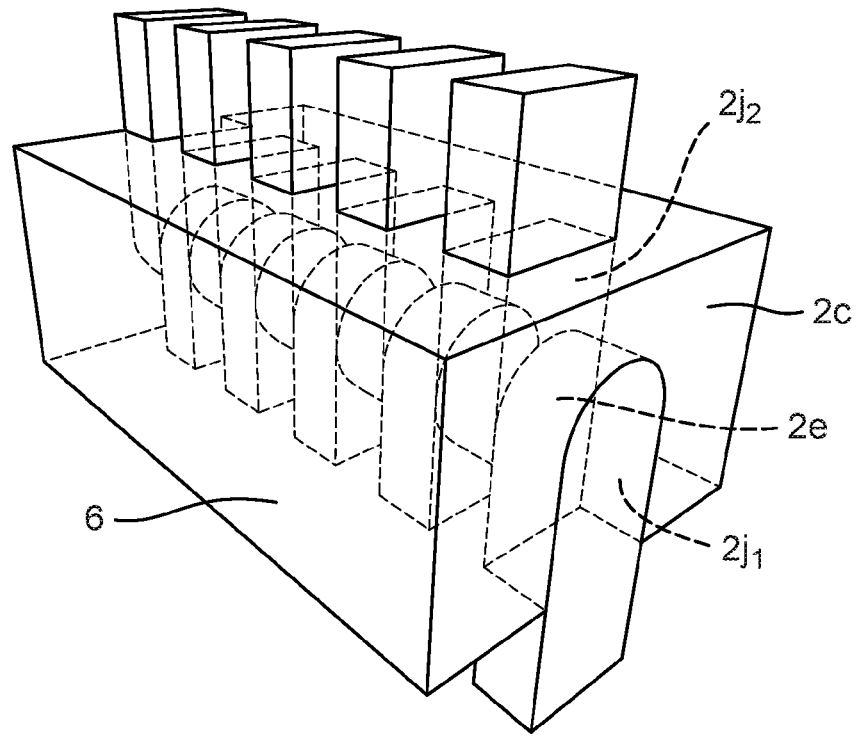
FIG. 4 shows a schematic view in perspective of a number of U-shaped profiles according to FIG. 3 in a situation after polymeric material has been injected into the mold cavity.
Figure 5:
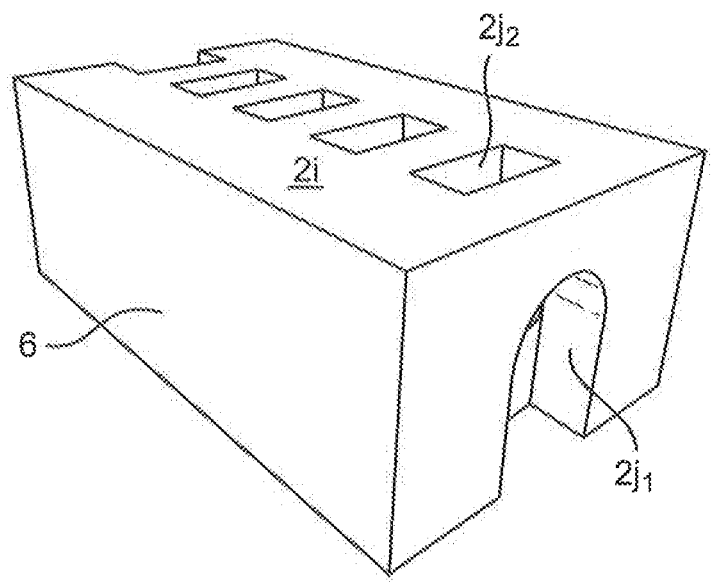
FIGS. 5 and 6 show schematic views in perspective of the polymeric material forming a respective link and after removal from the mold.
Figure 6:
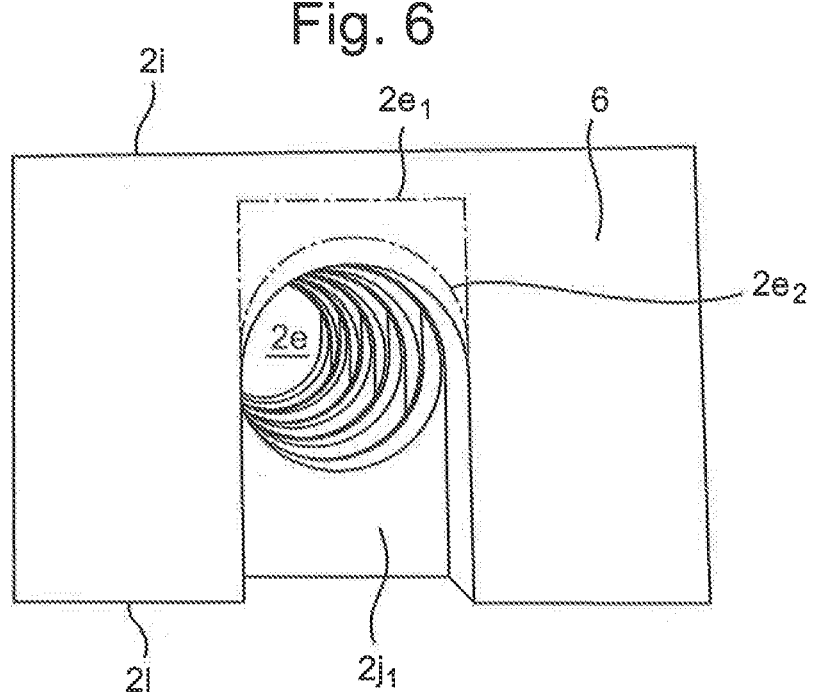

With regard to FIGS. 3 to 6 the molding method for manufacturing a modular belt link according to the invention will be described. FIG. 3 shows a schematic view in perspective of a number of U-shaped profiles which are part of a mold used in the molding method in a situation before polymeric material is injected into the mold cavity. FIG. 4 shows a schematic view in the situation after polymeric material has been injected into the mold cavity and FIGS. 5 and 6 show schematic views in perspective of the polymeric material forming a respective link and after removal from the mold.

In analogy with US-A1-2002/0179417 the method according to the invention comprising the step of providing a mold having mating mold halves providing a mold cavity for a modular belt link and the step of injecting polymeric material into the mold cavity.

The mold cavity is configured such that after molding a modular belt link is obtained having a leading edge and a trailing edge and further comprising a first plurality of laterally spaced link ends on the leading edge and a second plurality of laterally spaced link ends on the trailing edge, wherein the link ends of the first plurality are offset with regard to the link ends of the second plurality, each link end circumscribing an aperture, wherein the apertures of the link ends of the first plurality are aligned along a first axis and wherein the apertures of the link ends of the second plurality are aligned along a second axis, said molded modular belt link further comprising a top support surface provided between said leading and trailing edge and a bottom surface opposite the top surface.

According to the invention the mold comprises a number of U-shaped profiles 5 (FIGS. 3 and 4), which are configured and arranged such as to—after injecting polymeric material 6 (FIGS. 4, 5 and 6) into the mold cavity—form the aperture 2*e* in each of the link ends by providing for each link end at least two laterally adjoining, partly overlapping oblong U-shaped recesses 2*j*1, 2*j*2 (FIG. 4), which are alternately oriented such that the open end of one of the U-shaped recesses 2*j*2 opens in the top support surface 2*i* and the open end of an immediately adjoining U-shaped recess 2*j*1 opens in the bottom surface 2*l*. In this manner during molding no rods are required to form the apertures. In some embodiments, the shape and/or dimension of an aperture 2*e*1 of one link end of a plurality differs from the shape and/or dimension of the aperture 2*e*2 of at least one of the other link ends of said plurality.

The invention claimed is:

1. A modular conveyor belt including a plurality of modular belt links, each modular belt link comprising:
   a leading edge;
   a trailing edge;
   a first plurality of laterally spaced link ends on the leading edge;
   a second plurality of laterally spaced link ends on the trailing edge, wherein the link ends of the first plurality are offset with regard to the link ends of the second plurality for inserting link ends on a trailing edge of one modular belt link between link ends on the leading edge of an adjacent modular belt link, each link end circumscribing an aperture, wherein the apertures of the link ends of the first plurality are aligned along a first axis and wherein the apertures of the link ends of the second plurality are aligned along a second axis;
   a top support surface provided between said leading and trailing edge;
   a bottom surface opposite the top surface; and
   hinge connectors received in the respective apertures for pivotally connecting adjacent modular belt links thus forming the modular conveyor belt, wherein the aperture in each of the link ends is formed by at least two laterally adjoining, partly overlapping oblong U-shaped recesses, which are alternately oriented such that the open end of one of the U-shaped recesses opens in the top support surface and the open end of an immediately adjoining U-shaped recess opens in the bottom surface.

2. The modular conveyor belt according to claim 1, wherein the oblong U-shaped recesses of one link end, preferably a link end of the first plurality of laterally spaced link ends, overlap each other such that the aperture formed is circular.

3. The modular conveyor belt according to claim 1, wherein the oblong U-shaped recesses of one link end, preferably a link end of the second plurality of laterally spaced link ends, overlap each other such that the aperture formed is slot shaped.

4. The modular conveyor belt according to claim 1, wherein the shape and/or dimension of an aperture of one link end of a plurality is identical to the shape and/or dimension of the aperture of the other link ends of said plurality.

5. The modular conveyor belt according to claim 1, wherein the shape and/or dimension of an aperture of one link end of a plurality differs from the shape and/or dimension of the aperture of at least one of the other link ends of said plurality.

6. The modular conveyor belt according to claim 1, wherein the first axis and the second axis are parallel.

7. The modular conveyor belt according to claim 1, wherein the first axis and the second axis are positioned under a sharp angle with respect to each other, said angle having a value between 0.5° and 20°.

8. A modular belt link configured for use in a modular conveyor belt, said modular belt link comprising:
   a leading edge;
   a trailing edge;
   a first plurality of laterally spaced link ends on the leading edge;
   a second plurality of laterally spaced link ends on the trailing edge, wherein the link ends of the first plurality are offset with regard to the link ends of the second plurality, each link end circumscribing an aperture, wherein the apertures of the link ends of the first plurality are aligned along a first axis and wherein the apertures of the link ends of the second plurality are aligned along a second axis;

a top support surface provided between said leading and trailing edge; and a bottom surface opposite the top surface, wherein the aperture in each of the link ends is formed by at least two laterally adjoining, partly overlapping oblong U-shaped recesses, which are alternately oriented such that the open end of one of the U-shaped recesses opens in the top support surface and the open end of an immediately adjoining U-shaped recess opens in the bottom surface.

9. The modular belt link according to claim 8, wherein the oblong U-shaped recesses of one link end, preferably a link end of the first plurality of laterally spaced link ends, overlap each other such that the aperture formed is circular.

10. The modular belt link according to claim 8, wherein the oblong U-shaped recesses of one link end, preferably a link end of the second plurality of laterally spaced link ends, overlap each other such that the aperture formed is slot shaped.

11. The modular belt link according to claim 8, wherein the shape and/or dimension of an aperture of one link end of a plurality is identical to the shape and/or dimension of the aperture of the other link ends of said plurality.

12. The modular belt link according to claim 8, wherein the shape and/or dimension of an aperture of one link end of a plurality differs from the shape and/or dimension of the aperture of at least one of the other link ends of said plurality.

13. The modular belt link according to claim 8, wherein the first axis and the second axis are parallel.

14. The modular belt link according to claim 8, wherein the first axis and the second axis are positioned under a sharp angle with respect to each other, said angle preferably having a value between 0.5° and 20°.

15. A method for manufacturing a modular belt link according to claim 8, the method comprising:

providing a mold having mating mold halves providing a mold cavity for a modular belt link; and injecting polymeric material into the mold cavity, said mold cavity being configured such that after molding a modular belt link is obtained having a leading edge and a trailing edge and further comprising a first plurality of laterally spaced link ends on the leading edge and a second plurality of laterally spaced link ends on the trailing edge, wherein the link ends of the first plurality are offset with regard to the link ends of the second plurality, each link end circumscribing an aperture, wherein the apertures of the link ends of the first plurality are aligned along a first axis and wherein the apertures of the link ends of the second plurality are aligned along a second axis, said molded modular belt link further comprising a top support surface provided between said leading and trailing edge and a bottom surface opposite the top surface, characterized in that the mold comprises a number of U-shaped profiles, which are configured and arranged such as to form the aperture in each of the link ends after injecting polymeric material into the mold cavity by providing for each link end at least two laterally adjoining, partly overlapping oblong U-shaped recesses, which are alternately oriented such that the open end of one of the U-shaped recesses opens in the top support surface and the open end of an immediately adjoining U-shaped recess opens in the bottom surface.

* * * * *